United States Patent
Montgomery et al.

(10) Patent No.: US 12,493,670 B2
(45) Date of Patent: Dec. 9, 2025

(54) COLLABORATIVE USER INTERFACES TO CONFIGURE PARAMETERS OF API ENDPOINTS

(71) Applicant: Xano, Inc., Woodland Hills, CA (US)

(72) Inventors: Sean Montgomery, Woodland Hills, CA (US); Jacques Antikadjian, Woodland Hills, CA (US); Prakash Chandran, Woodland Hills, CA (US); Justin Alexander Albrecht, Santa Clarita, CA (US)

(73) Assignee: Xano, Inc., Woodland Hills, CA (US)

( * ) Notice: Subject to any disclaimer, the term of this patent is extended or adjusted under 35 U.S.C. 154(b) by 260 days.

(21) Appl. No.: 18/127,197

(22) Filed: Mar. 28, 2023

(65) Prior Publication Data
US 2024/0330418 A1    Oct. 3, 2024

(51) Int. Cl.
*G06F 21/31*     (2013.01)
*G06F 9/451*    (2018.01)
*G06F 21/62*     (2013.01)

(52) U.S. Cl.
CPC ............. *G06F 21/31* (2013.01); *G06F 9/451* (2018.02); *G06F 21/629* (2013.01)

(58) Field of Classification Search
CPC .... G06F 21/6218; G06F 21/604; G06F 21/31; G06F 21/629; G06F 9/451
USPC .......................................................... 726/17
See application file for complete search history.

(56) References Cited

U.S. PATENT DOCUMENTS

| | | | |
|---|---|---|---|
| 9,619,631 B1* | 4/2017 | DeHaan | G06F 21/31 |
| 9,710,127 B2* | 7/2017 | Torman | H04L 63/105 |
| 11,727,323 B2* | 8/2023 | Haramati | G06Q 10/063114 |
| | | | 705/52 |
| 2012/0297454 A1* | 11/2012 | Auger | H04L 63/107 |
| | | | 726/4 |
| 2013/0160108 A1* | 6/2013 | Stachel | G06F 21/31 |
| | | | 726/17 |
| 2016/0112429 A1* | 4/2016 | Sundaresan | H04L 63/08 |
| | | | 726/4 |
| 2018/0129359 A1* | 5/2018 | Torman | H04L 63/20 |
| 2020/0304511 A1* | 9/2020 | Rathore | G06F 21/31 |
| 2022/0070213 A1* | 3/2022 | Mutt | H04L 63/1483 |
| 2023/0362161 A1* | 11/2023 | Spector | H04L 63/108 |
| 2023/0396615 A1* | 12/2023 | Lin | H04L 63/20 |

* cited by examiner

*Primary Examiner* — Amare F Tabor
(74) *Attorney, Agent, or Firm* — Schwegman Lundberg & Woessner, P.A.

(57) ABSTRACT

Systems and methods of providing a collaborative interface with real-time permission management for configuring an API based on inputs received through interface elements presented within a GUI.

20 Claims, 15 Drawing Sheets

400

---

CAUSING DISPLAY OF A HIERARCHICAL PERMISSIONS INTERFACE TO DEFINE PERMISSIONS OF ONE OR MORE USER ACTIVITIES ASSOCIATED WITH ONE OR MORE USER ACCOUNTS, THE HIERARCHICAL PERMISSION INTERFACE COMPRISING A DISPLAY OF APLURALITY OF PERMISSION MENUS THAT INCLUDE A PRIMARY PERMISSION MENU, AND ONE OR MORE SECONDARY PERMISSION MENUS, EACH PERMISSION MENU AMONG THE PLURALITY OF PERMISSION MENUS COMPRISING A PRESENTATION OF A SET OF ACTIVITY IDENTIFIERS ASSOCIATED WITH THE ONE OR MORE USER ACTIVITIES

402

---

RECEIVING A DEFINITION OF A PERMISSION VALUE ASSOCIATED WITH A USER ACTIVITY IDENTIFIED BY AN ACTIVITY IDENTIFIER FROM AMONG THE SET OF ACTIVITY IDENTIFIERS WITHIN THE PRIMARY PERMISSION MENU, THE DEFINITION OF THE PERMISSION VALUE COMPRISING A USER IDENTIFIER ASSOCIATED WITH A USER ACCOUNT FROM AMONG THE ONE OR MORE USER ACCOUNTS, THE ACTIVITY IDENTIFIER, AND THE PERMISSION VALUE

404

---

IDENTIFYING A SECONDARY PERMISSION MENU FROM AMONG THE ONE OR MORE SECONDARY PERMISSION MENUS RESPONSIVE TO THE DEFINITION OF THE PERMISSION VALUE WITHIN THE PRIMARY PERMISSION MENU

406

---

PROPAGATING THE PERMISSION VALUE RECEIVED WITHIN THE PRIMARY PERMISSION MENU TO THE SECONDARY PERMISSION MENU

RECEIVING AN INPUT THAT ASSIGNS A ROLE FROM AMONG A SET OF ROLES TO A USER ACCOUNT, THE ROLE COMPRISING A SET OF PERMISSION VALUES
502

ASSIGNING THE SET OF PERMISSION VALUES TO THE SET OF ACTIVITY IDENTIFIERS WITHIN THE PRIMARY PERMISSION MENU BASED ON THE ROLE
504

600

RECEIVING A REQUEST TO DEFINE A ROLE, THE REQUEST COMPRISING A SET OF PERMISSION VALUES TO BE ASSOCIATED WITH EACH USER ACTIVITY AMONG A SET OF USER ACTIVITIES, AND A ROLE IDENTIFIER
602

GENERATING THE ROLE BASED ON THE REQUEST
604

CAUSING DISPLAY OF THE ROLE IDENTIFIER AMONG A SET OF ROLES DISPLAYED WITHIN A MENU ELEMENT
606

```
┌─────────────────────────────────────────────────────────────────┐
│ RECEIVING AN INPUT THAT SELECTS A USER IDENTIFIER FROM AMONG A  │
│   SET OF USER IDENTIFIERS PRESENTED WITHIN A MENU ELEMENT       │
│                              702                                │
└─────────────────────────────────────────────────────────────────┘
                                │
                                ▼
┌─────────────────────────────────────────────────────────────────┐
│  IDENTIFYING ONE OR MORE WORKBOOKS ASSOCIATED WITH A USER       │
│         ACCOUNT IDENTIFIED BY THE USER IDENTIFIER               │
│                              704                                │
└─────────────────────────────────────────────────────────────────┘
                                │
                                ▼
┌─────────────────────────────────────────────────────────────────┐
│  CAUSING DISPLAY OF ONE OR MORE SECONDARY PERMISSION MENUS      │
│         CORRESPONDING WITH THE ONE OR MORE WORKBOOKS            │
│                              706                                │
└─────────────────────────────────────────────────────────────────┘
```

RECEIVING, FROM A CLIENT DEVICE ASSOCIATED WITH A USER ACCOUNT, A REQUEST TO PERFORM A USER ACTIVITY WITH RESPECT TO A WORKBOOK
802

DETERMINING A PERMISSION VALUE ASSOCIATED WITH THE USER ACCOUNT BASED ON A SECONDARY PERMISSION MENU
804

CAUSING DISPLAY OF A NOTIFICATION AT THE CLIENT DEVICE BASED ON THE PERMISSION VALUE
806

FIG. 8

| ROLE | ACCESS | RUN/DEBUG | EXPORT | DATABASE | API | FUNCTION | ADDONS | TASKS | SETTINGS | MARKETPLACE | ADD WORKSPACE |
|---|---|---|---|---|---|---|---|---|---|---|---|
| ADMIN | FULL | READONLY | FULL | FULL | FULL | FULL | FULL | FULL | FULL | FULL | FULL |
| DEV | FULL | FULL | FULL | FULL | FULL | FULL | FULL | FULL | FULL | FULL | FULL |
| GUEST | DISABLED | DISABLED | DISABLED | READONLY | READONLY | READONLY | READONLY | READONLY | DISABLED | DISABLED | DISABLED |
| ANALYST | DISABLED | DISABLED | DISABLED | DISABLED | DISABLED | DISABLED | DISABLED | DISABLED | DISABLED | DISABLED | DISABLED |
| + ADD NEW ROLE | | | | | | | | | | | |

FIG. 11

# COLLABORATIVE USER INTERFACES TO CONFIGURE PARAMETERS OF API ENDPOINTS

TECHNICAL FIELD

Embodiments of the present disclosure relate generally to systems for generating and configuring an Application Programming Interface endpoint.

BACKGROUND

Automatic programming is a type of computer programming in which a mechanism generates a computer program to allow a human program to write code at a higher abstraction level. For example, systems exist which automate the creation of source code construction for all or part of a software application based on inputs received through a user interface or input file, from which syntactically correct high-level source code (for example C++, C#, Java, Python, Ruby, Perl, etc.) is automatically created. The created source code can be compiled or interpreted by the appropriate computerized system and subsequently executed.

A collaborative workspace refers to systems to enable a plurality of users to work on a shared task (i.e., "workbook") in a coordinated fashion, whereby permissions within the collaborative workspace may define the manner in which respective users are permitted to interact within the workspace. An issue with implementing a collaborative workspace in the context of systems to provide "automatic programming" as described above, is that portions of code may have downstream effects on other portions of code. Accordingly, if a user makes changes to a portion of code without awareness of other changes being made in real-time, then unintentional errors may be propagated through the code which may be difficult and tedious to identify and rectify.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating various operations of a collaborative API builder system in performing a method for managing permissions within a collaborative environment, according to certain example embodiments.

FIG. 6 is a flowchart illustrating various operations of a collaborative API builder system in performing a method for defining a role, according to certain example embodiments.

FIG. 7 is a flowchart illustrating various operations of a collaborative API builder system in performing a method for managing permissions within a collaborative environment, according to certain example embodiments.

FIG. 8 is a flowchart illustrating various operations of a collaborative API builder system in performing a method for managing permissions within a collaborative environment, according to certain example embodiments.

FIG. 11 is an interface diagram depicting a GUI which may be presented by a collaborative API builder system, according to certain example embodiments.

DETAILED DESCRIPTION

Figure 1:
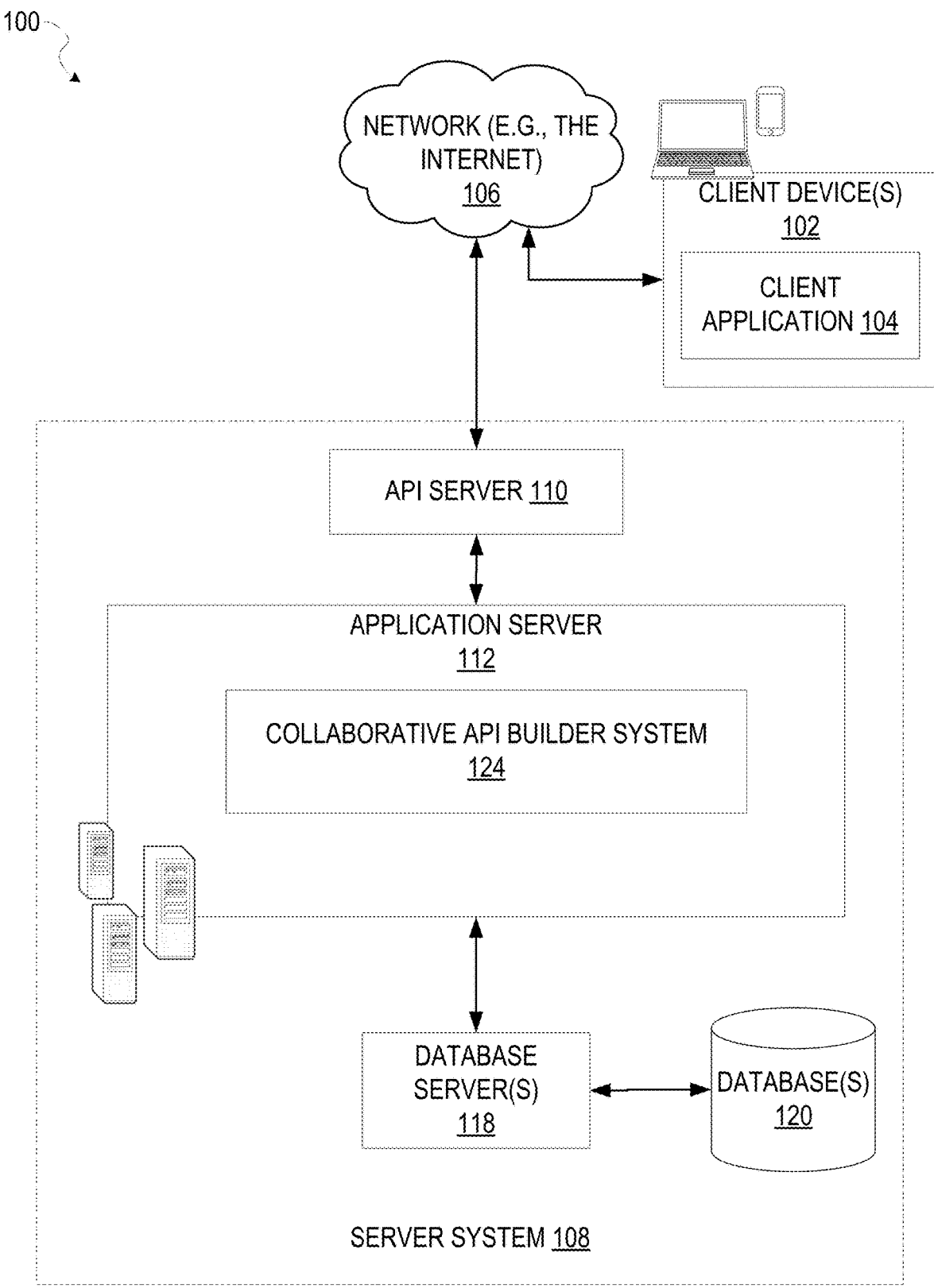
FIG. 1 is a block diagram showing an example system for exchanging data over a network in accordance with some embodiments, wherein the system includes an API builder system.

An Application Programming Interface (API) API is a computing interface which defines interactions between multiple software intermediaries. API may define the type of calls or requests which may be made, a calling sequence of a call stack, how to make them, the data formats that should be used, as well as the conventions to follow. API work by sending requests for information from a web application or web server and receiving a response, wherein the requests comprise inputs based on the requirements and configurations of the API. Traditionally, configuring an API requires a programmer (or team of programmers) to write code to perform specific commands of the API, which can often be prohibitively expensive or time consuming. Furthermore, the process of writing custom code for a large project may require significant collaboration and organization among a team of programmers. As a result, programmers may often find themselves writing and re-writing sections of code which may have been completed by other team members, further complicating the process. Accordingly, a system to provide a real-time collaborative environment for developing custom code, with configurable user permissions, would provide an improvement over existing systems.

Embodiments of the present disclosure relate generally to systems and methods of providing a collaborative interface with real-time permission management for configuring an API based on inputs which may be received through interface elements presented within a GUI. In various embodiments described herein, the system may perform operations that include: causing display of a graphical user interface (GUI) that comprises a hierarchical permissions interface to define permissions of one or more user activities associated with one or more user accounts, the hierarchical permission interface comprising a display of a plurality of permission menus that include a primary permission menu, and one or more secondary permission menus, each permission menu among the plurality of permission menus comprising a presentation of a set of activity identifiers associated with the one or more user activities; receiving a definition of a permission value associated with a user activity identified by an activity identifier from among the set of activity identifiers within the primary permission menu, the definition of the permission value comprising a user identifier associated with a user account from among the one or more user accounts, the activity identifier, and the permission value; identifying a secondary permission menu from among the one or more secondary permission menus responsive to the definition of the permission value within the primary permission menu; and propagating the permission value received within the primary permission menu to the secondary permission menu.

In some example embodiments, the primary permission menu may correspond with "global" permissions associated with the set of user accounts, while the one or more secondary permission menus may correspond with specific projects (i.e., "workbooks"), wherein each workbook comprises a set of authorized users. Accordingly, in some embodiments, a user may provide an input to select or otherwise identify one or more user accounts in order to cause the system to display a presentation of one or more secondary permission menus that correspond with workbooks that include the identified user accounts. Similarly, in some embodiments, a user may provide an input to select or otherwise identify one or more workbooks in order to display a presentation of the one or more secondary permission menus that correspond with the identified workbooks.

For example, the hierarchical permission interface may include a display of a set of menu elements that include a menu element to display a list of user identifiers associated with use accounts associated with a plurality of workbooks, whereby a user may provide an input to select one or more of the user identifiers from among the list of user identifiers in order to display corresponding secondary permission menus. Likewise, the set of menu elements may further comprise a menu element to display a list of workbook identifiers, whereby a user may provide an input to select one or more of the workbook identifiers in order to display corresponding secondary permission menus.

In some embodiments, permissions defined by a user within the primary permission menu may flow in a hierarchical fashion down to the secondary permission menus by default. Similarly, the primary permission menu may receive permissions from role-based permissions that may be assigned to the one or more user accounts, such that a user's assigned role may define their corresponding primary (i.e., "global") permissions. For example, a user may define a role based on a series of inputs, wherein a role may correspond with a set of selected permission values for a set of user activities. As an illustrative example, a user assigned an "administrator" role may be given full permissions and full access to all workbooks, whereas a user assigned as a "developer" role may only have access to a set of workbooks to which they are assigned.

In some embodiments, user permissions relative to a given workbook may dynamically change based on user inputs received within the workbook. For example, a first user may access a workbook and provide inputs to define or otherwise select parameters associated with a project associated with the workbook, such as an API. Accordingly, a second user that accesses the workbook may likewise provide an input to define or otherwise select parameters associated with the workbook. Responsive to receiving the input from the second user, and upon determining that the first user is actively engaged in defining parameters of the workbook, the system may present a notification at a client device of the second user, notifying the second user that the first user is actively working on the workbook. In some embodiments, the notification may include an indication of changes made by the first user and may further indicate a denial of the requested input received from the second user.

In some embodiments, the workbooks may comprise various interface to define parameters of an API. For example, a user may access a workbook to define or otherwise select parameters in which to configure a function of a function stack associated with an API, wherein each function may have corresponding commands that may be defined based on user inputs. Accordingly, as users collaborate on a workbook, the system may generate and present notifications wherein the notifications include indications of inputs received from each of the users associated with the workbook. The system may thereby display a representation of each function of a function stack in an interface element within the GUI, wherein the representation of each function may include information indicating when the function was defined, along with a user identifier associated with the user that defined it.

For example, in certain embodiments, a position of a representation of a function among a presentation of a set of functions of a function stack may define a calling sequence of the function stack. A user may therefore access a workbook to modify the calling sequence of the function stack by providing inputs that move and re-sequence the functions of the function stack within the presentation. Accordingly, responsive to receiving such inputs from a user account associated with the workbook, the system may restrict other users from accessing the same function until the user has finished making changes.

FIG. 1 is a block diagram showing an example system 100 for exchanging data over a network. The system 100 includes a client device 102, wherein the client device may execute a client application 104, and wherein the client application 104 is communicatively coupled to a server system 108 via a network 106 (e.g., the Internet). Accordingly, the client application 104 is able to communicate and exchange data with the server system 108 via the network 106. The data exchanged between client application 104, and the server system 108, includes functions (e.g., commands to invoke functions) as well as payload data (e.g., text, user inputs/selections).

The server system 108 provides server-side functionality via the network 106 to a particular client application 104. While certain functions of the system 100 are described herein as being performed by either a client application 104 or by the server system 108, it will be appreciated that the location of certain functionality either within the client application 104 or the server system 108 is a design choice. For example, it may be technically preferable to initially deploy certain technology and functionality within the server system 108, but to later migrate this technology and functionality to the client application 104 where a client device 102 has sufficient processing capacity.

The server system 108 supports various services and operations that are provided to the client application 104. Such operations include transmitting data to, receiving data from, and processing data generated by the client application 104. In some embodiments, this data includes, client device information, user input data, and text, as examples. In other embodiments, other data is used. Data exchanges within the system 100 are invoked and controlled through functions available via user interfaces (UIs) of the client application 104.

Turning now specifically to the server system 108, an API server 110 is coupled to, and provides a programmatic interface to, an application server 112. The application server 112 is communicatively coupled to a database server 118, which facilitates access to a database 120 in which is stored data associated with functions provided by a collaborative API builder system 124, and which may be processed by the application server 112.

Dealing specifically with the API server 110, this server receives and transmits data (e.g., commands and payloads) between the client device 102 and the application server 112. Specifically, the API server 110 provides a set of interfaces (e.g., routines and protocols) that can be called or queried by the client application 104 in order to invoke functionality of the application server 112. The API server 110 exposes various functions supported by the application server 112, including account registration, login functionality, and transmission of data, via the application server 112, from a client application 104. The application server 112 hosts a number of applications and subsystems, including the collaborative API builder system 124. The application server 112 is communicatively coupled to a database server 118, which facilitates access to a database 120 in which is stored data associated with the collaborative API builder system 124.

Figure 2:
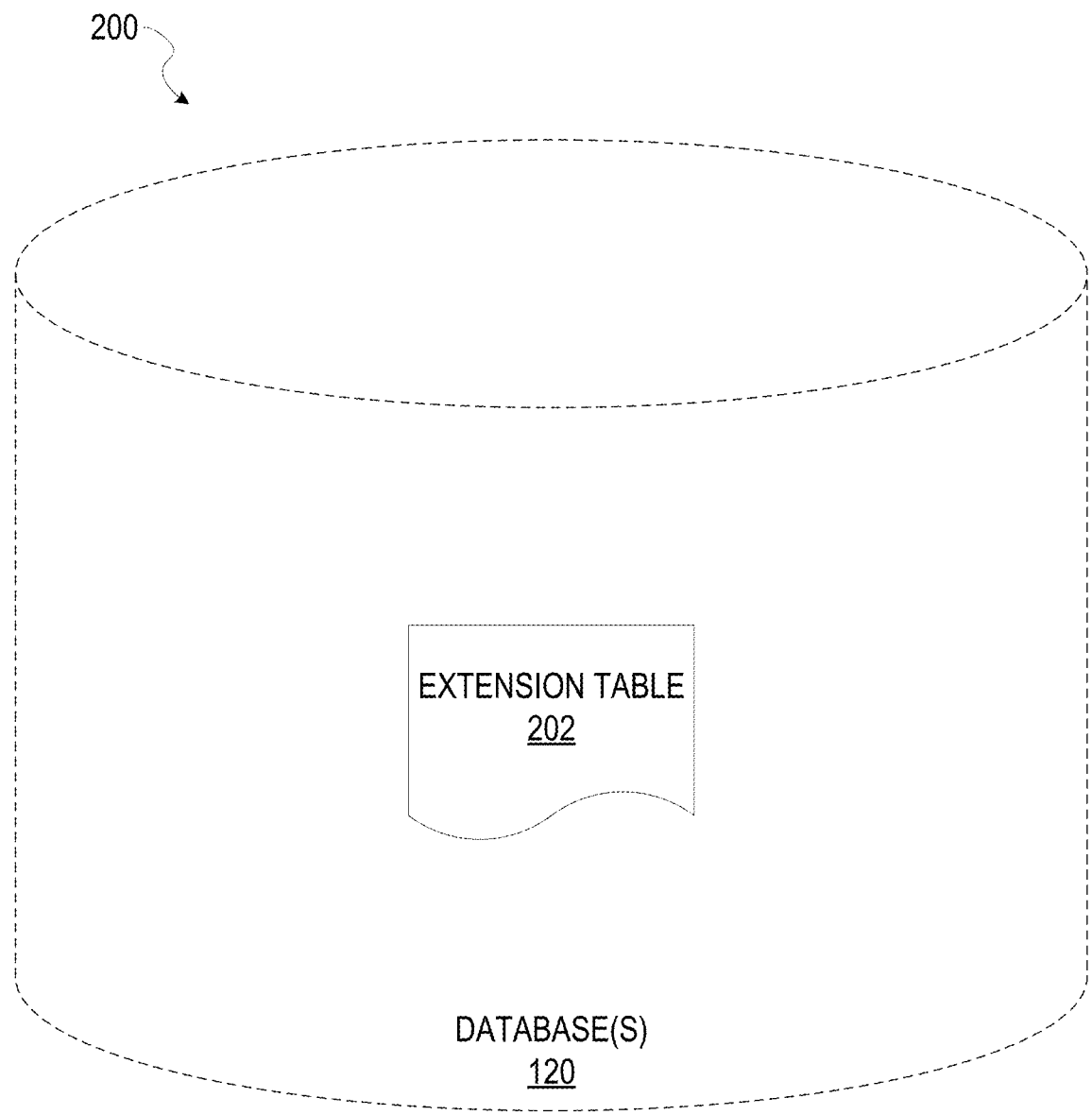
FIG. 2 is a schematic diagram illustrating data which may be stored in the database of the server system, according to certain example embodiments.

FIG. 2 is a schematic diagram 200 illustrating data 200 which may be stored in the database 120 of the server system 108, according to certain example embodiments. While the content of the database 120 is shown to comprise a number of tables, it will be appreciated that the data could be stored in other types of data structures (e.g., as an object-oriented database).

The database 120 includes data stored within an extension table 202, that comprises a set of code extensions which may correspond with interface elements that may be displayed within a GUI presented by the API builder system 124. Each code extension among the set of code extensions may for example correspond with a predefined segment of code which may be used by the API builder system 124 to configure an API, or parameters of an API. For example, the code extension may comprise a code "template" that comprises a segment of code that includes one or more fields to be populated based on inputs received via the GUI. In some embodiments, the database 120 may include data stored within the extension table 202, wherein the data comprises a list of roles with corresponding permission values.

Figure 3:
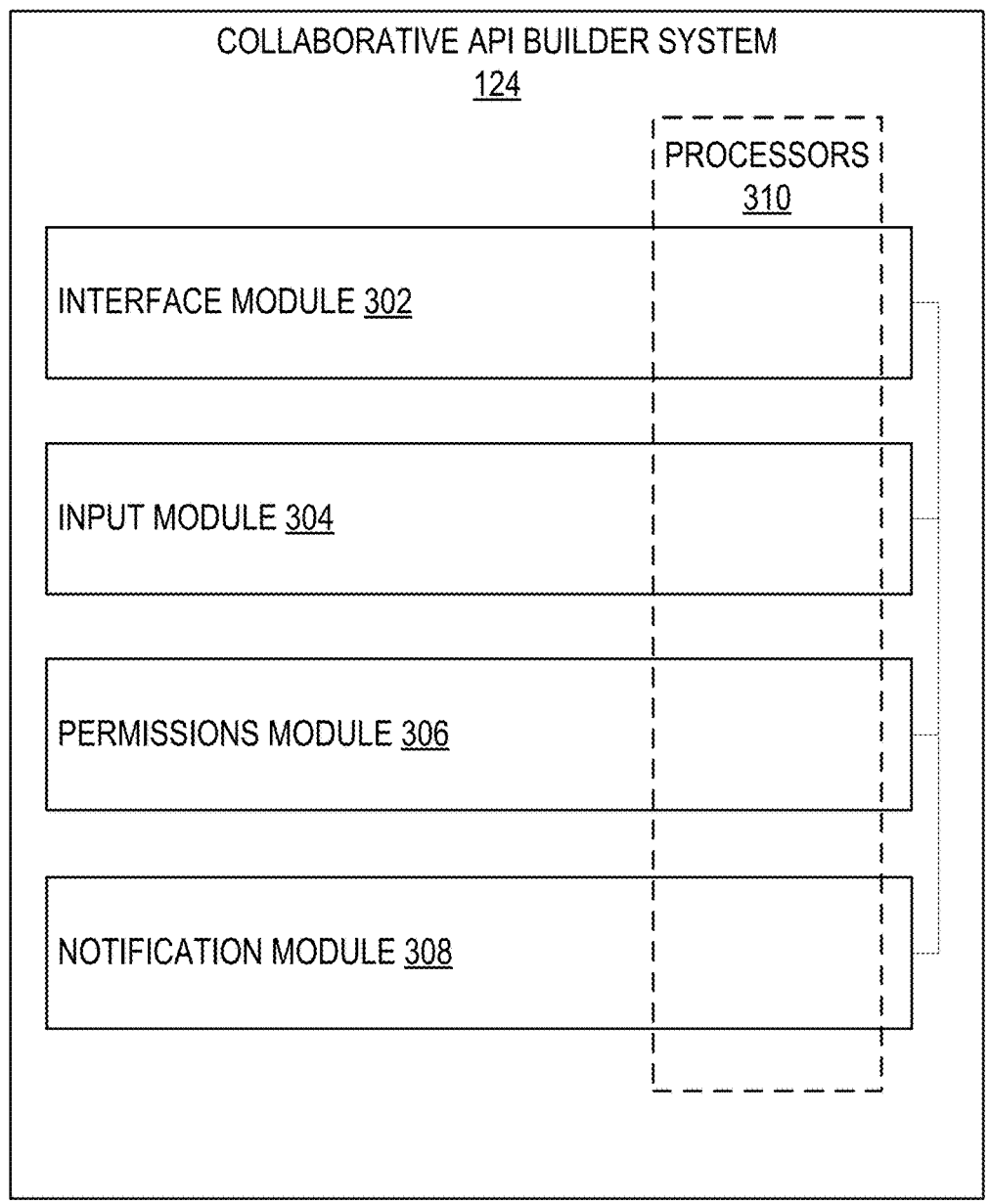
FIG. 3 is a block diagram illustrating various modules of a collaborative API builder system, according to certain example embodiments.

FIG. 3 is a block diagram illustrating components of the collaborative API builder system 124, that configure the collaborative API builder system 124 to provide a collaborative environment to generate and configure an API or API endpoint based on inputs that define parameters of the API, wherein the collaborative environment comprises a hierarchical permissions menu to define and manage permissions associated with one or more user accounts relative to one or more workbooks, according to some example embodiments. The collaborative API builder system 124 is shown as including an interface module 302, an input module 304, a permissions module 306, and a notification module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the collaborative API builder system 124 may physically include an arrangement of one or more of the processors 310 (e.g., a subset of or among the one or more processors of the machine) configured to perform the operations described herein for that module. As another example, any module of the collaborative API builder system 124 may include software, hardware, or both, that configure an arrangement of one or more processors 310 (e.g., among the one or more processors of the machine) to perform the operations described herein for that module. Accordingly, different modules of the collaborative API builder system 124 may include and configure different arrangements of such processors 310 or a single arrangement of such processors 310 at different points in time. Moreover, any two or more modules of the collaborative API builder system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating various operations of the collaborative API builder system 124 in performing a method 400 for managing permissions within a collaborative environment to configure an API endpoint based on a user input received via a plurality of client devices (i.e., the client devices 102), according to certain example embodiments. Operations of the method 400 may be performed by the modules described above with respect to FIG. 3. As shown in FIG. 4, the method 400 includes one or more operations 402, 404, 406, and 408.

At operation 402, the interface module 302 generates and causes display of a hierarchical permissions interface to define permissions of one or more user activities associated with one or more user accounts associated with the collaborative API builder system 124, wherein the hierarchical permission interface comprises a display of a plurality of permission menus that include a primary permission menu, and one or more secondary permission menus. According to certain example embodiments, each permission menu among the plurality of permission menus may correspond with a "workbook," wherein the workbook may comprise a set of interfaces to configure an API endpoint based on user inputs. Accordingly, the permission menus may include a presentation of a set of activity identifiers associated with the one or more user activities that may be performed by users relative to a workbook.

At operation 404, the input module 304 receives a definition of a permission value associated with a user activity identified by an activity identifier from among the set of activity identifiers within the primary permission menu. The definition may comprise a user identifier associated with a user account, an activity identifier, and a permission value, wherein the permission value may indicate an enabled status, or a disabled status.

At operation 406, the permission module 306 identifies a secondary permission menu from among the one or more secondary permission menus responsive to receiving the definition of the permission value. In some embodiments, the permission module 306 may identify the secondary permission menu based on the user identifier, wherein the secondary permission menu may correspond with a workbook in which a user account identified by the user identifier is assigned.

At operation 408, the permission module propagates the permission value received within the primary permission menu to the secondary permission menu. Accordingly, the user account identified by the user identifier may be assigned the permission value assigned to them within the primary permission menu, within the secondary permission menu that corresponds with the workbook to which they are assigned. In this way, a user of the collaborative API builder system 124 may assign and manage permissions of user accounts relative to a plurality of workbooks.

Figure 5:
FIG. 5 is a flowchart illustrating various operations of a collaborative API builder system in performing a method for managing permissions within a collaborative environment, according to certain example embodiments.

FIG. 5 is a flowchart illustrating various operations of a collaborative API builder system 124 in performing a method 500 for managing permissions within a collaborative environment, according to certain example embodiments. Operations of the method 500 may be performed by the modules described above with respect to FIG. 3. As shown in FIG. 5, the method 500 includes one or more operations 502, and 504. According to certain embodiments, the method 500 may be performed as a subroutine of the method 400 discussed above.

In some embodiments, the primary permission menu may inherit permission values from roles assigned to one or more user accounts. The input module 304 may receive an input that assigns a role from among a set of roles to a user account, wherein the role comprises a set of permission values. For example, in some embodiments a user may provide an input to select a user identifier associated with a user account. Responsive to receiving the input that selects the user identifier, the interface module 302 may generate and cause display of a menu element that includes a display of a set of roles that may be assigned to the user account.

Accordingly, at operation 502, the input module 304 may receive an input that selects a role from among a set of roles displayed within the menu element, wherein the role corresponds with a set of permission values.

Responsive to the input module 304 receiving the input that selects the role, the permission module 306 may assign the set of permission values associated with the role to the user account within the primary permission menu.

FIG. 6 is a flowchart illustrating various operations of a collaborative API builder system 124 in performing a method 600 for defining a role, according to certain example embodiments. Operations of the method 600 may be performed by the modules described above with respect to FIG. 3. As shown in FIG. 6, the method 600 includes one or more operations 602, 604, and 606. According to certain embodiments, the method 600 may be performed as a subroutine of the method 400, and the method 500 discussed above.

At operation 602, the input module 304 receives a request to define a role, wherein the request comprises a set of permission values to be associated with a set of user activities. In some embodiments, the request may include a role identifier to be assigned to the role.

At operation 604, the permission module 306 generates a role to be included among a set of roles.

At operation 606, the interface module 302 generates and causes display of a menu element to display a presentation of a list of roles that include the role identifier of the role defined based on the request.

FIG. 7 is a flowchart illustrating various operations of a collaborative API builder system 124 in performing a method 700 for managing permissions within a collaborative environment, according to certain example embodiments. Operations of the method 700 may be performed by the modules described above with respect to FIG. 3. As shown in FIG. 7, the method 700 includes one or more operations 702, 704, and 706. According to certain embodiments, the method 700 may be performed as a subroutine of the method 400, and the method 500 discussed above.

At operation 702, the input module 304 receives an input that selects an identifier from among a set of identifiers presented within a menu element. For example, the identifier may include a user identifier associated with a user account, or in some embodiments, may include a workbook identifier that identifies a workbook from among a plurality of workbooks.

At operation 704, the permission module 306 identifies one or more workbooks based on the selected identifier. For example, the one or more workbooks may include workbooks that comprise a list of authorized users, wherein the list of authorized users includes a user identified by a selected user identifier, or in some embodiments may include one or more workbooks that comprise a selected workbook identifier.

At operation 706, the interface module 302 generates and causes display of one or more secondary permission menus that correspond with the one or more workbooks identified by the selected identifier.

FIG. 8 is a flowchart illustrating various operations of a collaborative API builder system 124 in performing a method 800 for managing permissions within a collaborative environment, according to certain example embodiments. Operations of the method 800 may be performed by the modules described above with respect to FIG. 3. As shown in FIG. 8, the method 800 includes one or more operations 802, 804, and 806. According to certain embodiments, the method 800 may be performed as a subroutine of the method 400, and the method 500 discussed above.

At operation 802, the input module 304 receives, from a client device 102, a request to perform a user activity with respect to a workbook.

At operation 804 the permission module 306 determines a permission value associated with the user account relative to the workbook based on a permission value associated with the user activity within a secondary permission menu associated with the workbook.

At operation 806, the notification module 308 generates and causes display of a notification at the client device 102 based on the permission value associated with the user activity. For example, the notification may include an indication that the user is not authorized to perform the user activity.

Figure 9:
FIG. 9 is an interface diagram depicting a GUI which may be presented by a collaborative API builder system, according to certain example embodiments.

FIG. 9 is an interface diagram 900 depicting a GUI 902 which may be presented by a collaborative API builder system 124, according to certain example embodiments. As seen in the interface diagram 900, the collaborative API builder system 124 may generate and cause display of a GUI 902 that includes a hierarchical permissions interface 904.

According to certain example embodiments, the hierarchical permissions interface 904 may comprise one or more permissions menu elements, such as the primary permissions menu 912, and the secondary permissions menus 916, 918, and 920. Accordingly, permissions assigned to users within the primary permissions menu 912 may be propagated by the system into the secondary permissions menus 916, 918, and 920.

In some embodiments, each permissions menu within the hierarchical permissions interface may comprise a set of columns that correspond with one or more user actions that may be performed by a user, and a set of rows that correspond with each user among a plurality of users.

Accordingly, a user may provide inputs to define permissions associated with each user relative to a given user action.

In some embodiments, the primary permissions menu 912 may inherit permissions values from roles that may be assigned to users of the collaborative API builder system 124. For example, a user may assign a role to a user, and the collaborative API builder system 124 may display an identifier associated with the role at a position within each of the permissions menus, such as the role identifier 914 depicted in the interface diagram 900, wherein the role identifier 914 corresponds with a set of permissions value that may thereby be used to populate the primary permissions menu 912.

In some embodiments, a user may provide an input to define whether or not a given permissions value is to be inherited, or to be defined independently. For example, each of the secondary permissions menus 916, 918, and 920 may correspond with different workbooks. Accordingly, a user may provide an input to define permissions values within each permissions menu field in order to define privileges relative to each user action within the workbook, wherein the permissions value may include: enabled; disabled; or inherit. In such embodiments, the value of enabled may indicate that the user is granted permissions for a given user activity, while disabled may indicate that the user is not granted permissions for the given user activity. Selecting "inherit" within a secondary permissions menu, such as the permissions menu 916, may indicate that the permissions value is to be defined within the primary permissions menu 912. Similarly, selecting inherit permissions within the primary permissions menu 912 may cause the system to retrieve permissions values based on a role that may be assigned to a user.

In some embodiments, the hierarchical permissions menu 904 may include menu elements 908 and 910 to filter and display relevant permissions menus. For example, by selecting one or more user identifiers within the menu element 908, the hierarchical permissions menu 904 may display the primary permissions menu 904, and one or more secondary permissions menus that include user identifiers selected from within the menu element 908. Similarly, by selecting one or more workspace identifiers within the menu element 910, the hierarchical permissions menu 904 may display permissions menus that correspond with the selected workbooks.

Figure 10:
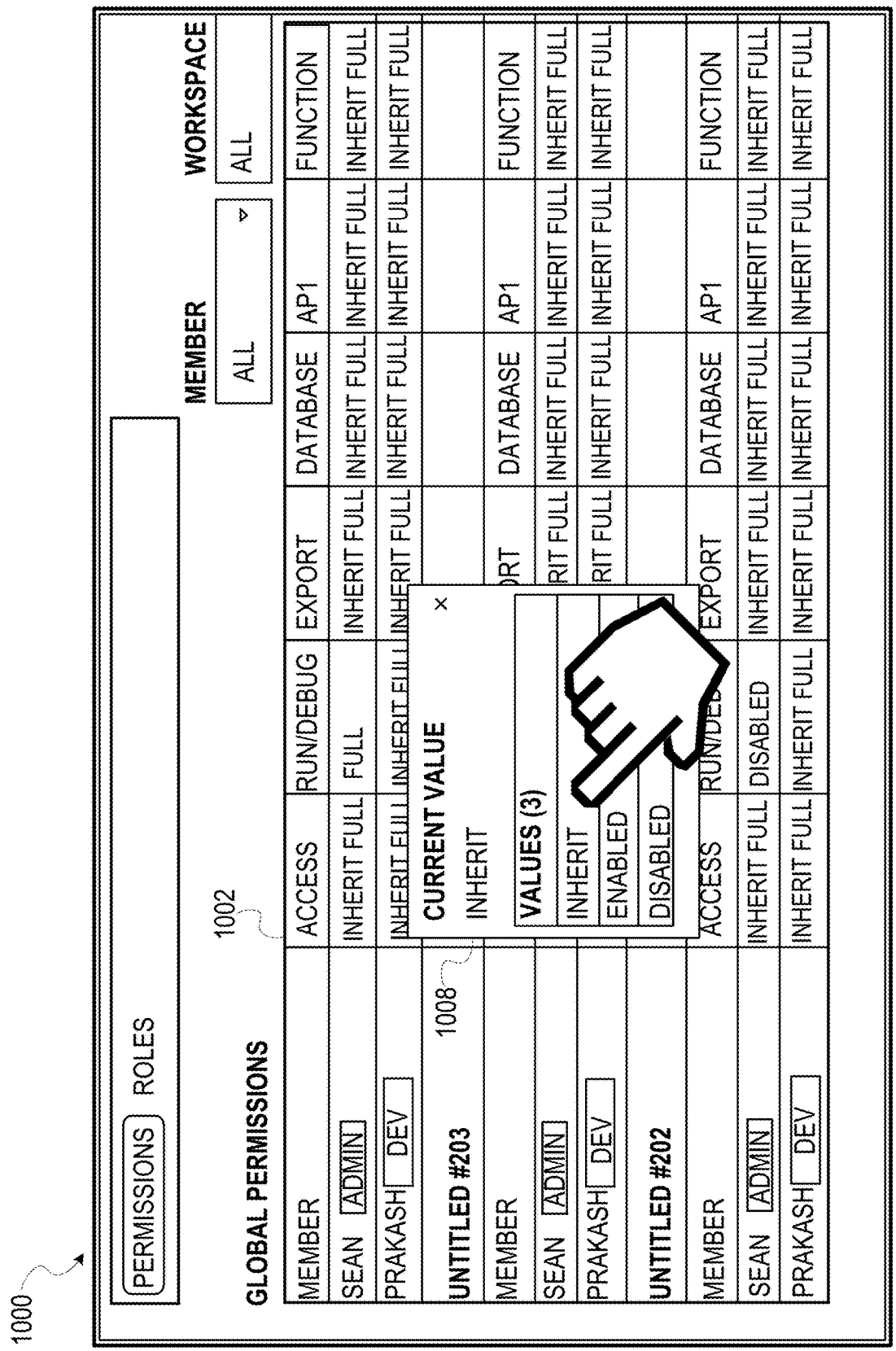
FIG. 10 is an interface diagram depicting a GUI which may be presented by a collaborative API builder system, according to certain example embodiments.

FIG. 10 illustrates an interface diagram 1000 of a GUI which may be presented by the API builder system 124, according to certain example embodiments. As seen in the interface diagram 1000, a permissions value menu 1008 may be presented by the collaborative API builder system 124 responsive to receiving an input that selects a permission value within one or more of the permissions menus, such as the permissions menu 1002. In some embodiments, the permissions value menu 1008 may include a display of one or more values that may be assigned to a given user action within a permissions menu.

FIG. 11 illustrates an interface diagram 1100 of a GUI 1102 which may be presented by the API builder system 124, according to certain example embodiments. As seen in the interface diagram 1100, the collaborative API builder system 124 may generate and cause display of an interface 1102 to define and manage permissions relative to each role that may be assigned to a user. Accordingly, the permissions values assigned to each role within the GUI 1102 may be propagated into a primary permissions menu based on the roles of each user within the primary permissions menu. In some embodiments, a user may provide inputs to create a new role to be presented among a list of roles displayed within the GUI 1102.

Figure 12:
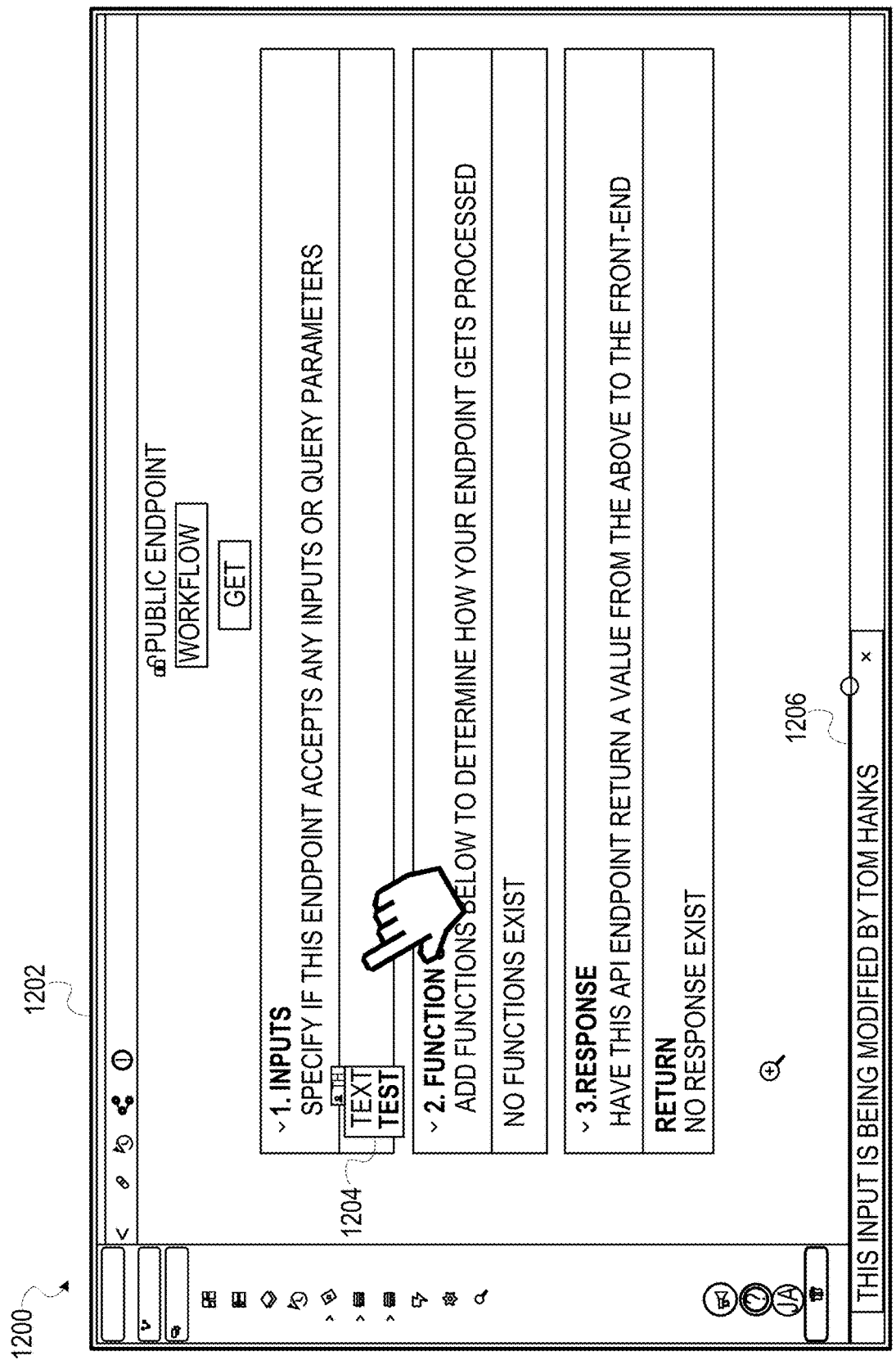
FIG. 12 is an interface diagram depicting a GUI which may be presented by a collaborative API builder system, according to certain example embodiments.

FIG. 12 illustrates an interface diagram 1200 of a GUI 1202 which may be presented by the API builder system 124, according to certain example embodiments. As seen in the interface diagram 1200, the GUI 1202 may include a collaboration interface wherein a plurality of users may access a common workbook to collaborate together. Accordingly, in certain embodiments, responsive to receiving an input from a client device 102 via the GUI 1202, the collaborative API builder system 124 may generate and cause display of an interface element 1204, wherein the interface element 1204 includes a display of a user identifier associated with the client device 102. The collaborative API builder system 124 may also display a notification 1206, wherein the notification 1206 includes a display of the user identifier associated with the client device 102.

Figure 13:
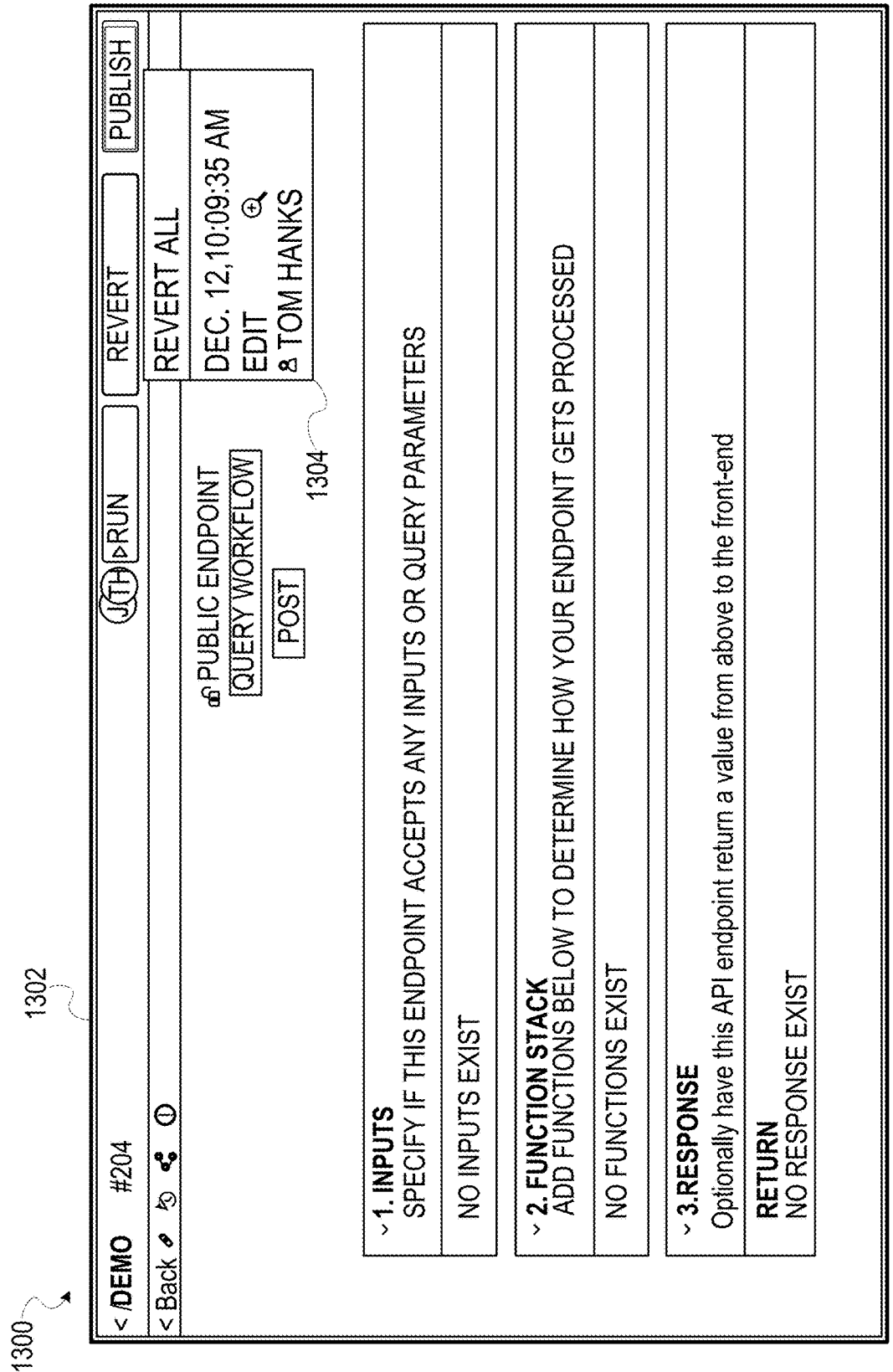
FIG. 13 is an interface diagram depicting a GUI which may be presented by a collaborative API builder system, according to certain example embodiments.

FIG. 13 illustrates an interface diagram 1300 of a GUI 1302 which may be presented by the API builder system 124, according to certain example embodiments. As seen in the interface diagram 1300, the GUI 1302 may include a notification 1304, wherein the notification 1304 includes a display of information related to collaborative inputs received relative to a workbook presented within the GUI 1302. For example, the information related to the collaborative inputs may include a user identifier associated with a user that may most recent changes or additions to the workbook, information related to the changes or additions that may have been made, as well as temporal information about any changes or additions.

Software Architecture

Figure 14:
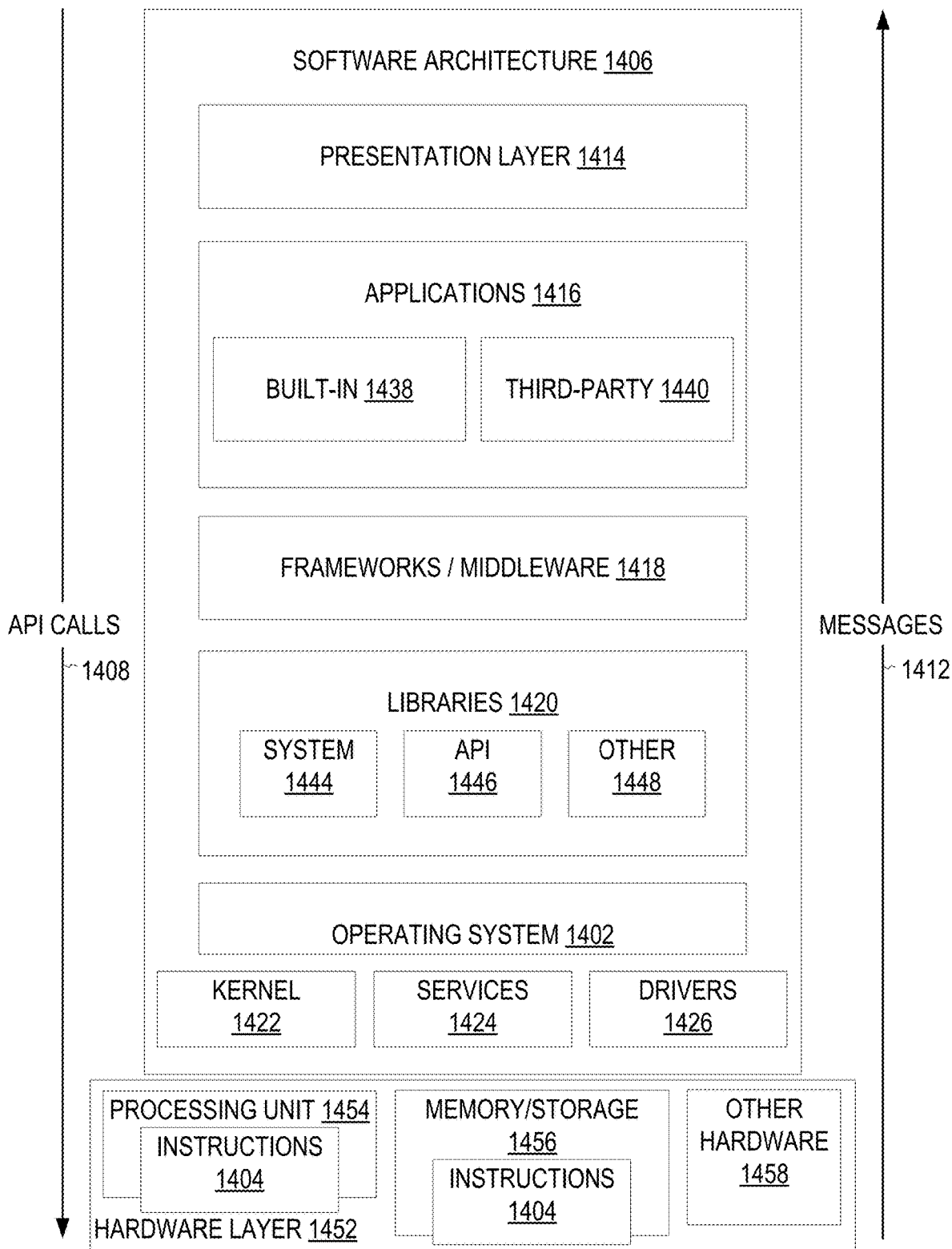
FIG. 14 is a block diagram illustrating a representative software architecture, which may be used in conjunction with various hardware architectures herein described and used to implement various embodiments.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1506 may execute on hardware such as machine 1500 of FIG. 15 that includes, among other things, processors 1504, memory 1514, and I/O components 1518. A representative hardware layer 1452 is illustrated and can represent, for example, the machine 1500 of FIG. 15. The representative hardware layer 1452 includes a processing unit 1454 having associated executable instructions 1404. Executable instructions 1404 represent the executable instructions of the software architecture 1406, including implementation of the methods, components and so forth described herein. The hardware layer 1452 also includes memory and/or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, applications 1416 and a presentation layer 1414. Operationally, the applications 1416 and/or other components within the layers may invoke API calls 1408 through the software stack and receive a response as in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424 and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various GUI functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. The third-party applications 1440 may invoke the API calls 1408 provided by the mobile operating system (such as operating system 1402) to facilitate functionality described herein.

Figure 15:
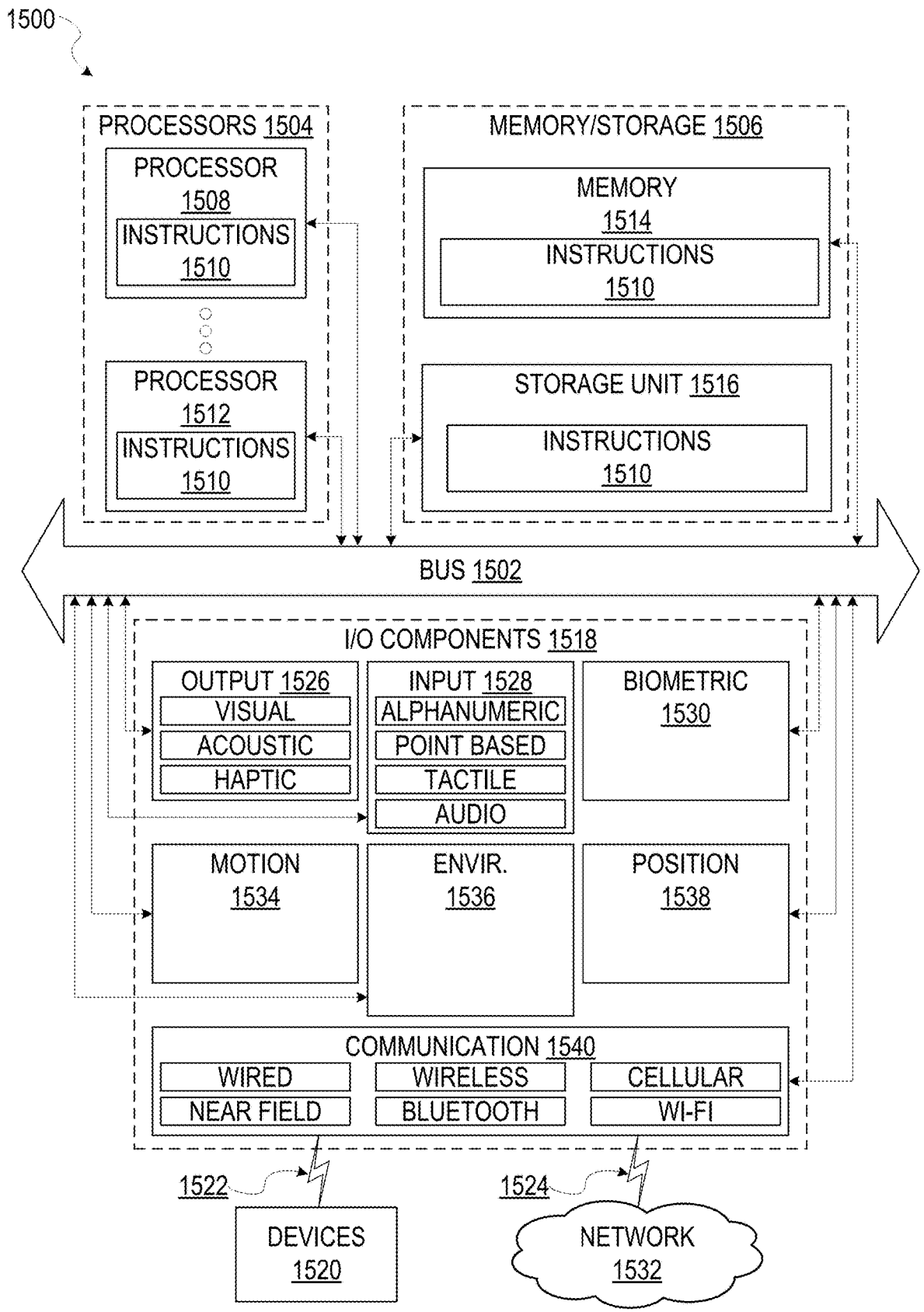
FIG. 15 is a block diagram illustrating components of a machine, according to some example embodiments, able to read instructions from a machine-readable medium (e.g., a machine-readable storage medium) and perform any one or more of the methodologies discussed herein.

The applications 1416 may use built in operating system functions (e.g., kernel 1422, services 1424 and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/component "logic" can be separated from the aspects of the application/component that interact with a user. FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components.

Communication may be implemented using a wide variety of technologies. The I/O components 1518 may include communication components 1540 operable to couple the machine 1500 to a network 1532 or devices 1520 via coupling 1522 and coupling 1524 respectively. For example, the communication components 1540 may include a network interface component or other suitable device to interface with the network 1532. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a Universal Serial Bus (USB)).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:
1. A system comprising:
a memory; and at least one hardware processor coupled to the memory and comprising instructions that causes the system to perform operations comprising:
causing display of a graphical user interface (GUI) that comprises a hierarchical permissions interface to define permissions of one or more user activities associated with one or more user accounts, the hierarchical permission interface comprising a display of a plurality of permission menus that include a primary permission menu, and one or more secondary permission menus, each permission menu among the plurality of permission menus comprising a presentation of a set of activity identifiers associated with the one or more user activities;
receiving a definition of a permission value associated with a user activity identified by an activity identifier from among the set of activity identifiers within the primary permission menu, the definition of the permission value comprising a user identifier associated with a user account from among the one or more user accounts, the activity identifier, and the permission value;
identifying a secondary permission menu from among the one or more secondary permission menus responsive to the definition of the permission value within the primary permission menu;
propagating the permission value received within the primary permission menu to the secondary permission menu;
receiving, from a first user via a first client device, an input to define parameters to configure a function of a function stack associated with an Application Programming Interface (API) associated with a workbook corresponding to the secondary permission menu;
receiving, from a second user via a second client device, an input to define parameters associated with the function stack within the workbook while the first user is engaged in defining parameters of the workbook;
determining that the first user is actively engaged in defining parameters of the workbook; and
denying the requested input received from the second user responsive to determining that the first user is actively engaged in defining parameters of the workbook.

2. The system of claim 1, wherein the secondary permission menu corresponds with a workbook, the workbook comprising a set of user accounts that include the user account, and wherein the identifying the secondary permission menu from among the one or more secondary permission menus includes:
identifying the secondary permission menu based on the selection of the user account.

3. The system of claim 1, wherein the receiving the definition of the permission value associated with the user activity identified by the activity identifier from among the set of activity identifiers within the primary permission menu includes:
receiving an input that assigns a role from among a set of roles to the user account, the role comprising a set of permission values that include the permission value; and
assigning the permission value to the user activity identified by an activity identifier from among the set of activity identifiers within the primary permission menu based on the role.

4. The system of claim 3, wherein the primary permission menu and the secondary permission menu include a presentation of a user identifier associated with the user account, and wherein the presentation of the user identifier includes the role assigned to the user account.

5. The system of claim 3, wherein the receiving the input that assigns the role from among the set of roles to the user account includes:
receiving a request to define the role, the request comprising the set of permission values associated with each user activity among the set of user activities;
generating the role based on the request; and
presenting the role among a set of roles displayed within a menu element.

6. The system of claim 1, wherein the GUI further comprises a menu element to display a plurality of user identifiers associated with a plurality of user accounts that include the user account, and wherein the causing display of the hierarchical permissions interface that comprises the plurality of permission menus that include the primary permission menu, and the one or more secondary permission menus includes:
receiving an input that selects a user identifier associated with the user account from within the menu element;
identifying one or more workbooks associated with the user account identified by the user identifier; and
causing display of the one or more secondary permission menus based on the one or more workbooks associated with the user account, the one or more secondary permission menus defining the permissions of the one or more user activities of the user account with respect to the one or more workbooks.

7. The system of claim 1, wherein the denying the requested input from the second user further comprises:
causing display of a notification at the second client device, wherein the notification includes a denial of the requested input.

8. The system of claim 1, wherein the permission value indicates a portion of the one or more user activities associated with the plurality of permission menus.

9. A method comprising:
causing display of a graphical user interface (GUI) that comprises a hierarchical permissions interface to define permissions of one or more user activities associated with one or more user accounts, the hierarchical permission interface comprising a display of a plurality of permission menus that include a primary permission menu, and one or more secondary permission menus, each permission menu among the plurality of permission menus comprising a presentation of a set of activity identifiers associated with the one or more user activities;
receiving a definition of a permission value associated with a user activity identified by an activity identifier from among the set of activity identifiers within the primary permission menu, the definition of the permission value comprising a user identifier associated with a user account from among the one or more user accounts, the activity identifier, and the permission value;
identifying a secondary permission menu from among the one or more secondary permission menus responsive to the definition of the permission value within the primary permission menu;
propagating the permission value received within the primary permission menu to the secondary permission menu;
receiving, from a first user via a first client device, an input to define parameters to configure a function of a function stack associated with an Application Programming Interface (API) associated with a workbook corresponding to the secondary permission menu;

receiving, from a second user via a second client device, an input to define parameters associated with the function stack within the workbook while the first user is engaged in defining parameters of the workbook;

determining that the first user is actively engaged in defining parameters of the workbook; and denying the requested input received from the second user responsive to determining that the first user is actively engaged in defining parameters of the workbook.

10. The method of claim 9, wherein the secondary permission menu corresponds with a workbook, the workbook comprising a set of user accounts that include the user account, and wherein the identifying the secondary permission menu from among the one or more secondary permission menus includes:

identifying the secondary permission menu based on the selection of the user account.

11. The method of claim 9, wherein the receiving the definition of the permission value associated with the user activity identified by the activity identifier from among the set of activity identifiers within the primary permission menu includes:

receiving an input that assigns a role from among a set of roles to the user account, the role comprising a set of permission values that include the permission value; and assigning the permission value to the user activity identified by an activity identifier from among the set of activity identifiers within the primary permission menu based on the role.

12. The method of claim 11, wherein the primary permission menu and the secondary permission menu include a presentation of a user identifier associated with the user account, and wherein the presentation of the user identifier includes the role assigned to the user account.

13. The method of claim 11, wherein the receiving the input that assigns the role from among the set of roles to the user account includes:

receiving a request to define the role, the request comprising the set of permission values associated with each user activity among the set of user activities;

generating the role based on the request; and presenting the role among a set of roles displayed within a menu element.

14. The method of claim 9, wherein the GUI further comprises a menu element to display a plurality of user identifiers associated with a plurality of user accounts that include the user account, and wherein the causing display of the hierarchical permissions interface that comprises the plurality of permission menus that include the primary permission menu, and the one or more secondary permission menus includes:

receiving an input that selects a user identifier associated with the user account from within the menu element;

identifying one or more workbooks associated with the user account identified by the user identifier; and causing display of the one or more secondary permission menus based on the one or more workbooks associated with the user account, the one or more secondary permission menus defining the permissions of the one or more user activities of the user account with respect to the one or more workbooks.

15. The method of claim 9, wherein the denying the requested input from the second user further comprises:

causing display of a notification at the second client device, wherein the notification includes a denial of the requested input.

16. The method of claim 9, wherein the permission value indicates a portion of the one or more user activities associated with the plurality of permission menus.

17. A non-transitory machine-readable storage medium, comprising instructions that when executed by one or more processors of a machine, cause the machine to perform operations comprising:

causing display of a graphical user interface (GUI) that comprises a hierarchical permissions interface to define permissions of one or more user activities associated with one or more user accounts, the hierarchical permission interface comprising a display of a plurality of permission menus that include a primary permission menu, and one or more secondary permission menus, each permission menu among the plurality of permission menus comprising a presentation of a set of activity identifiers associated with the one or more user activities;

receiving a definition of a permission value associated with a user activity identified by an activity identifier from among the set of activity identifiers within the primary permission menu, the definition of the permission value comprising a user identifier associated with a user account from among the one or more user accounts, the activity identifier, and the permission value;

identifying a secondary permission menu from among the one or more secondary permission menus responsive to the definition of the permission value within the primary permission menu;

propagating the permission value received within the primary permission menu to the secondary permission menu;

receiving, from a first user via a first client device, an input to define parameters to configure a function of a function stack associated with an Application Programming Interface (API) associated with a workbook corresponding to the secondary permission menu;

receiving, from a second user via a second client device, an input to define parameters associated with the function stack within the workbook while the first user is engaged in defining parameters of the workbook;

determining that the first user is actively engaged in defining parameters of the workbook; and denying the requested input received from the second user responsive to determining that the first user is actively engaged in defining parameters of the workbook.

18. The non-transitory machine-readable storage medium of claim 17, wherein the secondary permission menu corresponds with a workbook, the workbook comprising a set of user accounts that include the user account, and wherein the identifying the secondary permission menu from among the one or more secondary permission menus includes:

identifying the secondary permission menu based on the selection of the user account.

19. The non-transitory machine-readable storage medium of claim 17, wherein the receiving the definition of the permission value associated with the user activity identified by the activity identifier from among the set of activity identifiers within the primary permission menu includes:

receiving an input that assigns a role from among a set of roles to the user account, the role comprising a set of permission values that include the permission value; and assigning the permission value to the user activity identified by an activity identifier from among the set of activity identifiers within the primary permission menu based on the role.

20. The non-transitory machine-readable storage medium of claim 19, wherein the primary permission menu and the secondary permission menu include a presentation of a user identifier associated with the user account, and wherein the presentation of the user identifier includes the role assigned to the user account.

* * * * *